(12) United States Patent
Yeakley et al.

(10) Patent No.: US 9,805,751 B1
(45) Date of Patent: Oct. 31, 2017

(54) RECORD HEAD ACTUATOR SANDWICHED DAMPER PLUS TRAVEL LIMITER

(71) Applicant: Oracle International Corporation, Redwood City, CA (US)

(72) Inventors: Darryl Wayne Yeakley, Erie, CO (US); Steven G. Suttle, Broomfield, CO (US); William Joseph Vanderheyden, Loveland, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/411,130

(22) Filed: Jan. 20, 2017

(51) Int. Cl.
*G11B 5/48* (2006.01)
*G11B 5/55* (2006.01)

(52) U.S. Cl.
CPC .......... *G11B 5/5504* (2013.01); *G11B 5/4893* (2013.01)

(58) Field of Classification Search
None
See application file for complete search history.

(56) References Cited

U.S. PATENT DOCUMENTS

| | | | | |
|---|---|---|---|---|
| 4,646,183 A | * | 2/1987 | Cohen | G11B 5/5504 360/261.3 |
| 5,227,937 A | * | 7/1993 | Magnusson | G11B 5/588 360/241.3 |
| 5,377,052 A | * | 12/1994 | Guzman | G11B 5/5504 360/241.3 |
| 5,644,453 A | * | 7/1997 | Eckberg | G11B 5/5504 360/261.3 |
| 5,677,806 A | * | 10/1997 | Eckberg | G11B 5/5504 360/77.01 |
| 5,699,211 A | * | 12/1997 | Magnusson | G11B 5/53 360/271.5 |
| 5,710,681 A | * | 1/1998 | Eckberg | G11B 5/5504 360/261.1 |
| 5,726,834 A | * | 3/1998 | Eckberg | G11B 5/5504 360/261.1 |
| 5,739,984 A | * | 4/1998 | Eckberg | G11B 5/5504 360/261.1 |
| 5,793,573 A | * | 8/1998 | Eckberg | G11B 5/5504 360/261.3 |
| 6,229,674 B1 | * | 5/2001 | Todd | G11B 5/5504 360/261.1 |
| 7,542,234 B1 | * | 6/2009 | Goodknight | G11B 5/584 360/130.21 |
| 9,275,666 B1 | * | 3/2016 | Vanderheyden | |
| 2004/0184195 A1 | * | 9/2004 | Nayak | G11B 5/5504 360/261.1 |

(Continued)

*Primary Examiner* — Will J Klimowicz
(74) *Attorney, Agent, or Firm* — Invoke

(57) ABSTRACT

A magnetic recording head positioning assembly includes a coarse travel carriage secured to and spaced away from each of a front end assembly and head assembly via sandwiched fine guiding flexures and isolation flexures. The fine guiding flexures permit relative movement between the coarse travel carriage and head assembly. The isolation flexures permit relative movement between the coarse travel carriage and front end assembly. The fine guiding and isolation flexures thus isolate the coarse travel carriage from the front end assembly and head assembly. The assembly further includes dampers sandwiched between the coarse travel carriage and isolation flexures to limit movement of the isolation flexures.

20 Claims, 3 Drawing Sheets

(56) References Cited

U.S. PATENT DOCUMENTS

| | | | | |
|---|---|---|---|---|
| 2007/0171577 A1* | 7/2007 | Ycas | ................... | G11B 5/4893 |
| | | | | 360/261.1 |
| 2008/0198506 A1* | 8/2008 | Weng | ................... | G11B 5/5504 |
| | | | | 360/101 |
| 2010/0309579 A1* | 12/2010 | Nayak | ................... | G11B 5/584 |
| | | | | 360/75 |
| 2012/0170153 A1* | 7/2012 | Yeakley | ............... | G11B 5/5504 |
| | | | | 360/241 |
| 2015/0248915 A1* | 9/2015 | Haeberle | ................ | G11B 21/24 |
| | | | | 360/241.3 |
| 2015/0348586 A1* | 12/2015 | Yeakley | ............. | H02K 41/0352 |
| | | | | 360/260 |

\* cited by examiner

RECORD HEAD ACTUATOR SANDWICHED DAMPER PLUS TRAVEL LIMITER

TECHNICAL FIELD

This disclosure relates to head actuators that are used to position recording heads in data storage tape drives.

BACKGROUND

Head actuators are used to move a recording head relative to a recording media. This recording head motion allows servo readers and read/write elements on the head to be aligned correctly to the media during track following read/write operations.

Typically, recording head positioning requirements are high bandwidth. That is, head position changes required to keep the head in the correct location on the media must be made quickly and accurately. There are a number of variables that are considered in the design of recording head actuators in order to maintain high bandwidth head positioning. One of these is the actuator's response to input frequencies. Out-of-plane resonances in the moving head can create dynamic instabilities that reduce the bandwidth of the head actuator. The result is a tape drive that does not meet its performance requirements.

SUMMARY

A recording head actuator may be configured such that its bodies of mass are isolated to better tune the frequency response to certain operational and impact events. Flexures, which in some examples are thin, band-like plates used to connect isolated bodies of mass, can facilitate such isolation. Here, parallel sets of flexures are used to isolate bodies of mass associated with coarse travel head adjustment and fine travel head adjustment. This dual isolation can improve recording head performance in the presence of vibration and offer increased protection to shock and handling events.

In one embodiment, a magnetic recording head positioning assembly includes a front end assembly, a head assembly, and a coarse travel carriage spaced away from the front end and head assemblies. The front end assembly includes an isolation mount and a voice coil motor housing and coil assembly. The head assembly includes a fine travel carriage, head carrier, and recording head. Fine guiding flexures are secured to the coarse travel carriage and head assembly to permit relative movement between the coarse travel carriage and head assembly. And, isolation flexures are sandwiched between the fine guiding flexures and secured to the coarse travel carriage and front end assembly to permit relative movement between the coarse travel carriage and front end assembly.

In another embodiment, a coarse adjustment subassembly for a magnetic recording head positioning assembly includes an isolation mount, a voice coil motor housing and coil assembly secured to the isolation mount to form a front end assembly, and a coarse travel carriage spaced away from the front end assembly. One or more isolation flexures are secured to the coarse travel carriage and front end assembly to permit relative movement between the coarse travel carriage and front end assembly. And, one or more dampers are disposed between and compressed by the coarse travel carriage and the isolation flexures to limit travel of the isolation flexures.

In yet another embodiment, a magnetic recording head positioning assembly includes a coarse travel carriage secured to and spaced away from each of a front end assembly and head assembly via sandwiched fine guiding flexures and isolation flexures. This arrangement is such that the fine guiding flexures permit relative movement between the coarse travel carriage and head assembly, and the isolation flexures permit relative movement between the coarse travel carriage and front end assembly to isolate the coarse travel carriage from the front end assembly and head assembly. Dampers are sandwiched between the coarse travel carriage and isolation flexures to limit movement of the isolation flexures.

DETAILED DESCRIPTION

Figure 1:
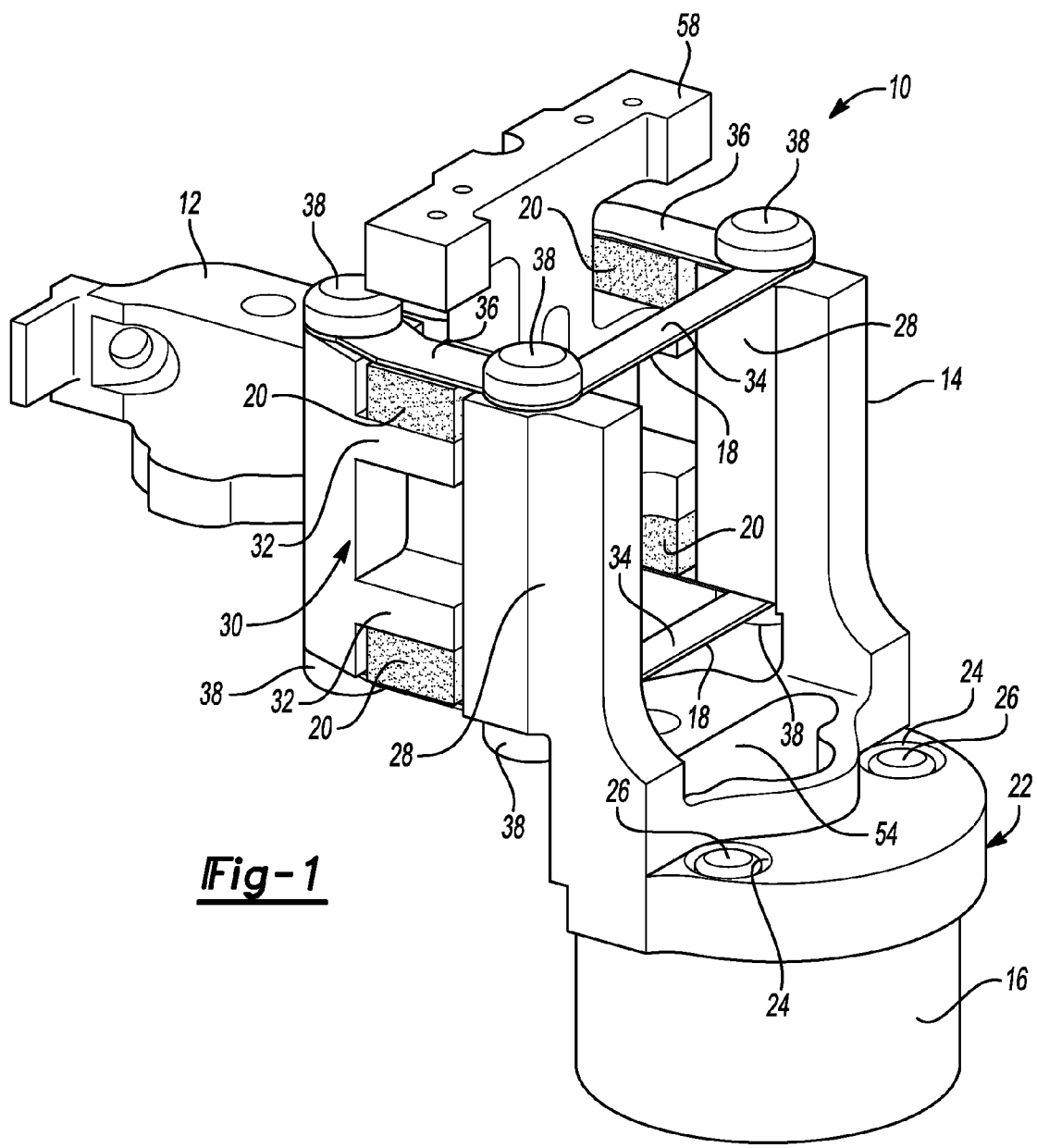
FIG. 1 is a perspective view of a coarse adjustment subassembly for a magnetic recording head positioning assembly.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

One method practiced today for reducing out-of-plane resonances in recording head actuators is to isolate significant bodies of mass inherent in the actuator from the actuated mass of the moving recording head. Isolating these mass bodies from the moving head works to minimize their effect on the frequency response of the actuated head by reducing the occurrence of out-of-plane resonances in the head. One conventional method for isolating bodies of mass in actuator design is to use isolation flexures. Flexure isolation can be an effective method of mass isolation and frequency response improvement but its implementation can be problematic. Two inherent problems with implementing flexure isolation into actuator design are that 1) flexure isolated masses have their own resonant frequencies that can show up and degrade the frequency response of the actuated head and 2) flexure isolated systems are susceptible to damage when exposed to shock and handling events that force the flexures to bend beyond their travel limits. Shock events that might damage isolation flexures can occur during product shipping. Flexure damage due to rough handling can occur during the manufacturing process.

The first problem of flexure isolated masses having their own resonant frequencies is addressed by conventional methods, one of which includes adding dampers to the actuator design to damp out resonant frequencies before they can get into the actuated head. The second problem of flexure isolated systems being susceptible to damage when exposed to shock and handling events is not addressed today and is the problem being addressed here.

Recording head actuator sandwiched dampers plus travel limiters disclosed here address situations in which flexure isolated systems are susceptible to bending damage when exposed to shock and handling events. Certain embodiments may incorporate components that are sandwiched between the moving isolation flexures and static surfaces within the head actuator assembly. These new damping plus travel limiting components may perform a dual function. First, they may be made out of energy dissipative materials (e.g., foam, etc.) that remove energy from the moving isolation flexures and therefore damp out isolation flexure motion. This reduces the likelihood that the flexure isolated mass resonant frequencies will negatively impact the frequency response of the moving head. Second, these new sandwiched components may become stiffer as they are compressed between the isolation flexures and static surfaces of the head actuator. This stiffening response to compression reduces the amount of isolation flexure travel that can occur during shock and handling events which in turn reduces the likelihood that the flexure isolated system will be damaged by bending during shipping and handling.

Referring to the embodiment of FIG. 1, a coarse adjustment subassembly 10 of a magnetic recording head positioning assembly (FIGS. 2 and 3) includes a coarse travel carriage 12, an isolation mount 14, a voice coil motor housing and coil assembly 16, isolation flexures 18, and dampers 20. The mount 14 defines a cupped region 22, having bores 24, configured to receive the assembly 16. Fasteners 26 secure the mount 14 and assembly 16 together such that they move together as a single front end assembly unit. The mount 14 also defines a pair of legs 28 that extend away from the region 22 to form a support to which the carriage 12 is attached via the flexures 18 as described further below.

The carriage 12 defines a mounting region 30 configured to be arranged adjacent to and spaced away from the legs 28 such that the carriage 12 and mount 14 are spaced away from each other. The region 30 includes two pair of opposing platforms 32 that provide mounting surfaces for the dampers 20. Each pair corresponds to one of the legs 28. And the dampers 20, relative to the legs 28, are situated near opposite ends. The legs 28 and platforms 32 thus define partial cavities within which the dampers 20 are disposed.

The flexures 18, which are U-shaped in this example, are positioned at opposite ends of the legs 28. A base 34 of each of the flexures 18 extends between the legs 28, and arms 36 of each of the flexures 18 extend to the region 30 and over the dampers 20 such that the dampers 20 are sandwiched between the platforms 32 and arms 36. Fasteners 38 secure the bases 34 to the legs 28 and the arms 36 to the region 30 to thereby compress the dampers 20 between the platforms 32 and arms 36. Unlike previous arrangements in which the carriage 12 and assembly 16 are rigidly mounted together, here the carriage 12 and front end assembly formed by the mount 14 and assembly 16 can move relative to one another via flexing of the flexures 18. Further, cyclic flexing of the flexures 18 is damped by the compressed dampers 20. The flexures 18 and dampers 20 thus act to isolate the carriage 12 from the mount 14.

Figure 2:
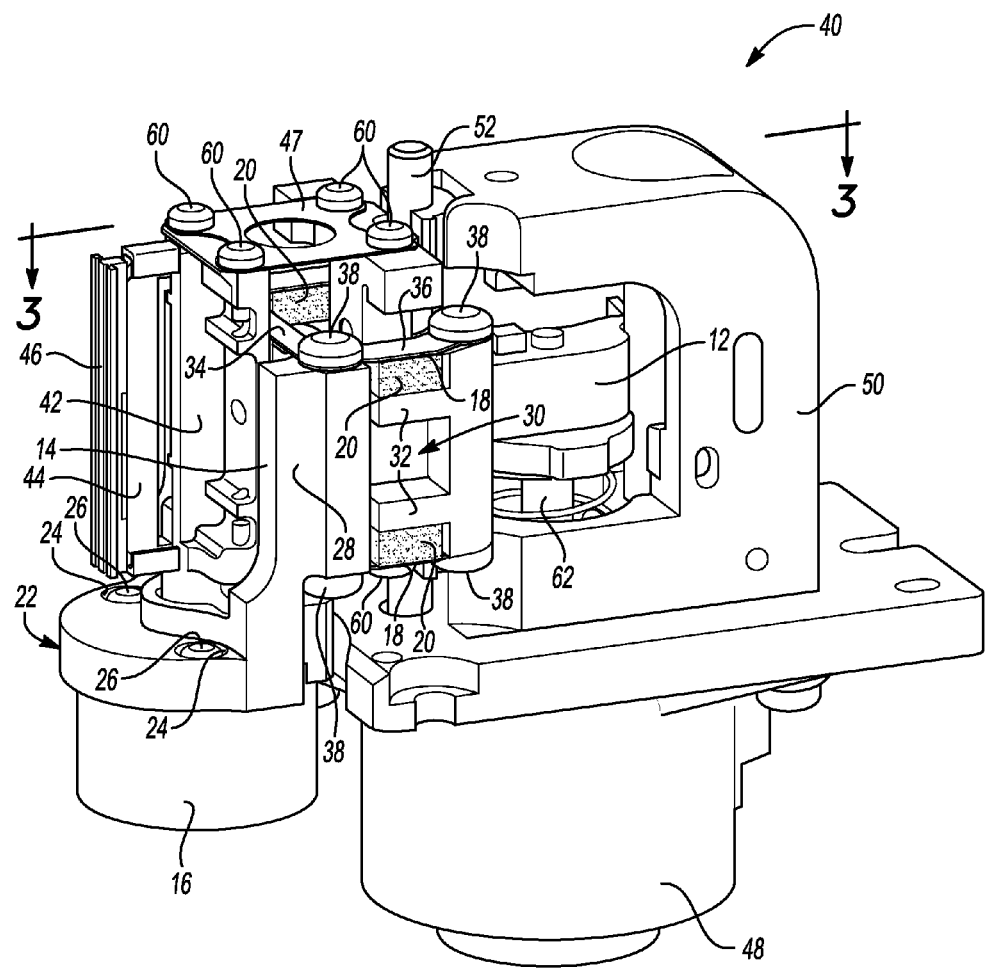
FIG. 2 is a perspective view of a magnetic recording head positioning assembly.
Figure 3:
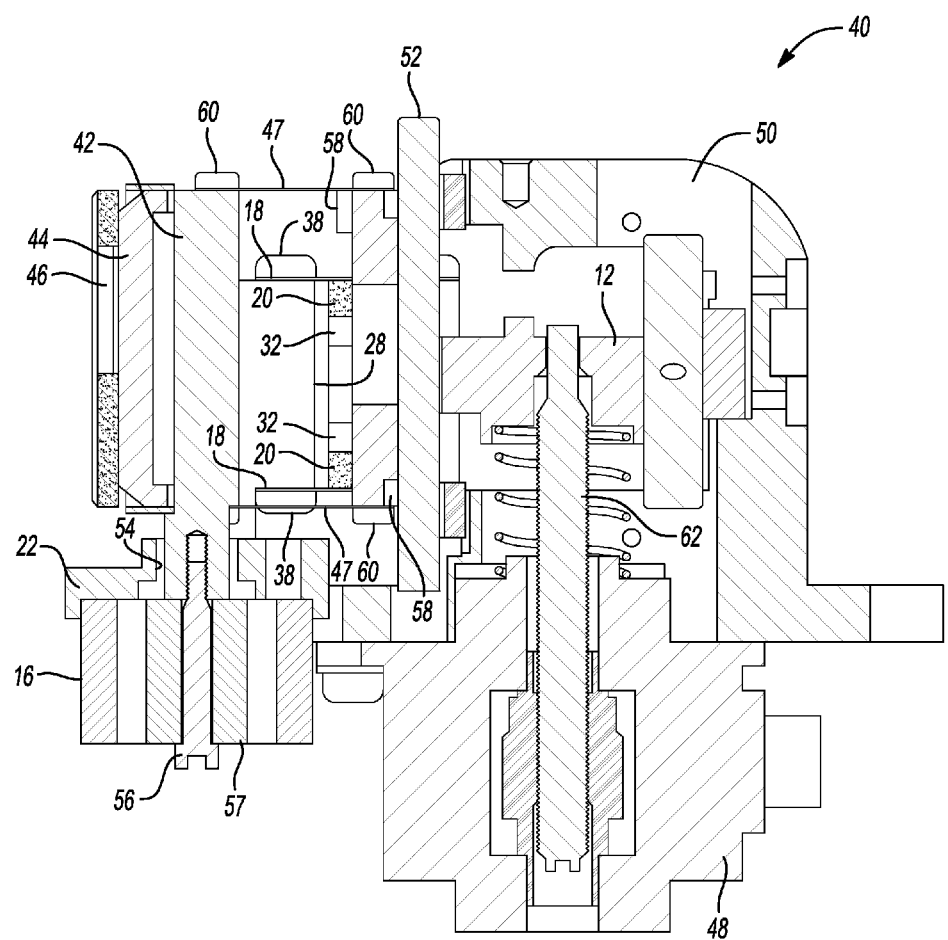
FIG. 3 is a side view, in cross-section, of the magnetic recording head positioning assembly of FIG. 2.

Referring to FIGS. 2 and 3, the subassembly 10 is shown within the context of a magnetic recording head positioning assembly 40. Other than the components of the subassembly 10, the assembly 40 includes a fine travel carriage 42, a head carrier 44, a recording head 46, fine guiding flexures 47, a coarse actuation motor 48, a coarse actuation motor mount 50, and a coarse guiding shaft 52. Additional conventional components are also shown. They, however, are not necessarily labelled or explicitly mentioned for the sake of discussion clarity.

The carriage 42 is disposed between the legs 28 and extends from the assembly 16 through an opening 54 in the region 22. The carrier 44 is bonded to the carriage 42, and the head 46 is attached to the carrier 44 such that the carriage 42, carrier 44, and head 46 move together as a single unit. A screw 56 clamping magnets 57 of the assembly 16, and engaged with the carriage 42 facilitates movement of the carriage 42 (and carrier 44 and head 46) relative to the mount 14. Operation of the assembly 16 causes the magnets 57, which may move relative to the assembly 16, and screw 56 to move the carriage 42 closer to or further away from a housing of the assembly 16 in the axial direction of the screw 56.

The flexures 47, which are rectangular shaped in this example, are positioned near opposite ends of the carriage 42, and span between the carriage 42 and mounting platforms 58 of the region 30 such that the flexures 47 sandwich the flexures 18 and dampers 20 therebetween. Fasteners 60 secure the flexures 47 to the carriage 42 and platforms 58 to permit relative movement between the carriage 12 and carriage 42 (and carrier 44 and head 46). The flexures 47 thus act to isolate the carriage 12 from the carriage 42 (and carrier 44 and head 46), and to guide the head 46 relative to recording media (not shown) in a data storage tape drive.

Because the flexures 18 and dampers 20 are nested between the flexures 47, the head 46 is thus provided with dual (or parallel) isolation protection. To the extent the mount 14, assembly 16, carriage 42, carrier 44, and head 46 move together during coarse travel adjustment, these components are isolated from the carriage 12 via the flexures 18 and dampers 20. To the extent the carriage 42, carrier 44, and head 46 move together during fine travel adjustment, these components are isolated from the carriage 12 via the flexures 47.

The motor 48, mount 50, and coarse guiding shaft 52 facilitate movement of the carriage 12. The shaft 52 is slidably mounted to the mount 50 via guide bushings. And, the carriage 12 is fixedly mounted to the shaft 52. A spring loaded lead screw 62 extending from within the motor 48 and through the mount 50 is engaged with carriage 12. Operation of the motor 48 causes elements therein to rotate in clock-wise or counter-clock-wise directions relative to the screw 62 to move the carriage 12 closer to or further away from the motor 48 and relative to the mount 50.

Equal and opposite forces exist between the housing of the assembly 16 and the screw 56 and magnets 57. Forces drive assembly 16 when the head 46 is actuated to follow movements of a recording media. This can feed energy into the mount 50, via the carriage 12, and energy into the head 46 because the carriage 42, carrier 44, and head 46 all ride on the carriage 12 and mount 50. Isolating the carriage 12 from the assembly 16 via the flexures 18 as described reduces the amount of energy that can be fed back into the carriage 12 and mount 50, which in turn improves the frequency response of the head 46. As such, the damper/flexure arrangements contemplated herein make the assembly 40 more robust against shock and handling events for the reasons explained above.

While example embodiments are described above, it is not intended that these embodiments describe all possible forms encompassed by the claims. The carriage 12, mount 14, assembly 16, carriage 42, etc., for example, are shown to take particular forms. These forms, however, largely depend on the specific application and environment, and may be different. The carriage 12 need not include platforms 32. Recessed areas in an otherwise solid wall may suffice. The mount 14 need not define a pair of legs. A single pedestal may also be used. Moreover, movement of the carriages 12, 42 may of course be facilitated by motors or apparatus other than that described.

The flexures 47 are shown to sandwich the flexures 18. The other-way-round is also possible. The carriage 12 and mount 14 (if present) may be configured such that mounting surfaces for the flexures 18 are outside those for the flexures 47. In this arrangement, the flexures 47 are nested within the flexures 18. Use of a single flexure 18 (as opposed to a pair) is also possible. In such scenarios, the number of dampers 20 would of course be reduced relative to designs including multiple flexures 18.

The flexures 47 are shown to be fastened to their mating components. They may instead be bonded as appropriate.

The flexures 18, 47 are shown to be U and rectangular shaped respectively. Any suitable shape (e.g., I-shaped, L-shaped, O-shaped, etc.), however, may be used. To the extent there are more than one of the flexures 18, they need not have the same shape or thickness. Simulation and testing may reveal that different shaped or different thickness (or both) flexures may have better performance than same shaped/thickness flexures. For reference, the flexures 18 in the example of FIGS. 1, 2 and 3 are approximately 7 thousandths of an inch thick. Although different shaped/thickness flexures 47 are also contemplated, media tracking performance may limit the extent to which these flexures can be different.

The spans of the flexures 18, 47 are shown to be different. That is, the distance between the carriage 12 and mount 14 is less than the distance between the carriage 12 and carriage 42. These spans, however, can be the same, or the distance between the carriage 12 and mount 14 can be greater than the distance between the carriage 12 and carriage 42 as design constraints dictate. Among other things, the spans may influence the optimum shape/thickness of the flexures 18, 47.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A magnetic recording head positioning assembly comprising:
   a front end assembly including an isolation mount and a voice coil motor housing and coil assembly;
   a head assembly including a fine travel carriage, head carrier, and recording head;
   a coarse travel carriage spaced away from the front end assembly and head assembly;
   fine guiding flexures secured to the coarse travel carriage and head assembly, and configured to permit relative movement between the coarse travel carriage and head assembly; and
   isolation flexures sandwiched between the fine guiding flexures, secured to the coarse travel carriage and front end assembly, and configured to permit relative movement between the coarse travel carriage and front end assembly.

2. The magnetic recording head positioning assembly of claim 1 further comprising dampers disposed between and compressed by the coarse travel carriage and isolation flexures.

3. The magnetic recording head positioning assembly of claim 1, wherein the isolation mount defines a pair of legs and wherein the isolation flexures are disposed at opposite ends of the legs.

4. The magnetic recording head positioning assembly of claim 3, wherein each of the fine guiding flexures is disposed adjacent to one of the opposite ends.

5. The magnetic recording head positioning assembly of claim 3, wherein the isolation flexures are U-shaped.

6. The magnetic recording head positioning assembly of claim 5, wherein bases of the isolation flexures span between and are attached to the legs.

7. The magnetic recording head positioning assembly of claim 5, wherein arms of the isolation flexures span between and are attached to the coarse travel carriage and front end assembly.

8. The magnetic recording head positioning assembly of claim 1, wherein the isolation flexures have different shapes.

9. The magnetic recording head positioning assembly of claim 1, wherein the isolation flexures have different thicknesses.

10. A coarse adjustment subassembly for a magnetic recording head positioning assembly, comprising:
    an isolation mount;
    a voice coil motor housing and coil assembly secured to the isolation mount to form a front end assembly;
    a coarse travel carriage spaced away from the front end assembly;
    one or more isolation flexures secured to the coarse travel carriage and front end assembly, and configured to permit relative movement between the coarse travel carriage and front end assembly; and
    one or more dampers disposed between and compressed by the coarse travel carriage and the isolation flexures to limit travel of the isolation flexures.

11. The coarse adjustment subassembly of 10, wherein the isolation mount defines a pair of legs and wherein the isolation flexures are disposed at opposite ends of the legs.

12. The coarse adjustment subassembly of claim 11, wherein the isolation flexures have different shapes or different thicknesses.

13. The coarse adjustment subassembly of claim 11, wherein the isolation flexures are U-shaped.

14. The coarse adjustment subassembly 13, wherein bases of the isolation flexures span between and are attached to the legs.

15. The coarse adjustment subassembly 14, wherein arms of the isolation flexures span between and are attached to the coarse travel carriage and front end assembly.

16. A magnetic recording head positioning assembly comprising:

a coarse travel carriage secured to and spaced away from each of a front end assembly and head assembly via sandwiched fine guiding flexures and isolation flexures such that the fine guiding flexures permit relative movement between the coarse travel carriage and head assembly and the isolation flexures permit relative movement between the coarse travel carriage and front end assembly to isolate the coarse travel carriage from the front end assembly and head assembly; and dampers sandwiched between the coarse travel carriage and isolation flexures to limit movement of the isolation flexures.

17. The magnetic recording head positioning assembly of claim 16, wherein the isolation flexures are disposed between the fine guiding flexures.

18. The magnetic recording head positioning assembly of claim 16, wherein the isolation flexures have a same shape.

19. The magnetic recording head positioning assembly of claim 16, wherein the isolation flexures have a same thickness.

20. The magnetic recording head positioning assembly of claim 16, wherein the front end assembly includes an isolation mount and a voice coil motor housing and coil assembly and wherein the head assembly includes a fine travel carriage, head carrier, and recording head.

* * * * *

UNITED STATES PATENT AND TRADEMARK OFFICE
CERTIFICATE OF CORRECTION

PATENT NO. : 9,805,751 B1  
APPLICATION NO. : 15/411130  
DATED : October 31, 2017  
INVENTOR(S) : Yeakley et al.

Page 1 of 1

It is certified that error appears in the above-identified patent and that said Letters Patent is hereby corrected as shown below:

In the Claims

In Column 6, Line 60, in Claim 11, after "of" insert -- claim --.

In Column 7, Line 1, in Claim 14, after "subassembly" insert -- of claim --.

In Column 7, Line 4, in Claim 15, after "subassembly" insert -- of claim --.

Signed and Sealed this  
Nineteenth Day of June, 2018

Andrei Iancu  
*Director of the United States Patent and Trademark Office*